United States Patent
Lee et al.

(10) Patent No.: US 7,023,534 B2
(45) Date of Patent: Apr. 4, 2006

(54) OPTICAL MODULATING APPARATUS HAVING BIAS CONTROLLER AND BIAS CONTROL METHOD

(75) Inventors: Gyu-Woong Lee, Suwon-si (KR); Yun-Je Oh, Yongin-si (KR); Seong-Taek Hwang, Pyeongtaek-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

(21) Appl. No.: 10/883,055

(22) Filed: Jul. 1, 2004

(65) Prior Publication Data

US 2005/0157290 A1    Jul. 21, 2005

(30) Foreign Application Priority Data

Jan. 15, 2004    (KR) .................. 10-2004-0003067

(51) Int. Cl.
*G01N 21/00*    (2006.01)
(52) U.S. Cl. .................................... 356/73.1
(58) Field of Classification Search .............. None
See application file for complete search history.

(56) References Cited

U.S. PATENT DOCUMENTS

| | | | | |
|---|---|---|---|---|
| 5,060,310 A * | 10/1991 | Frisch et al. | ................ | 398/193 |
| 5,424,680 A * | 6/1995 | Nazarathy et al. | .......... | 330/149 |
| 5,734,469 A * | 3/1998 | Strandjord | .................. | 359/459 |
| 6,046,810 A * | 4/2000 | Sanders et al. | ............. | 356/459 |

\* cited by examiner

*Primary Examiner*—Tu T. Nguyen
(74) *Attorney, Agent, or Firm*—Cha & Reiter, LLC

(57) ABSTRACT

Disclosed are an optical modulating apparatus having a bias controller and a bias control method using the same, which can automatically perform a bias adjust so as to keep the optical output characteristic of an optical modulator constant. The optical modulating apparatus includes an optical modulator to modulate an optical carrier using a bias signal; and a bias controller to adjust the bias signal of the optical modulator by detecting a second harmonic signal of the modulated optical signal, setting a minimum point of the second harmonic signal as a reference bias voltage, and then comparing a magnitude of the second harmonic signal that changes according to an external environment with a magnitude of a signal generated from the reference bias voltage.

8 Claims, 9 Drawing Sheets

OPTICAL MODULATING APPARATUS HAVING BIAS CONTROLLER AND BIAS CONTROL METHOD

CLAIM OF PRIORITY

This application claims priority to an application entitled "Optical modulating apparatus having bias controller and bias control method using the same," filed in the Korean Intellectual Property Office on Jan. 15, 2004 and assigned Serial No. 2004-3067, the contents of which are hereby incorporated by reference.

BACKGROUND OF THE INVENTION

1. Field of the Invention

The present invention relates to an optical modulating apparatus, and more particularly to an optical modulating apparatus having a bias controller and a bias control method, which can automatically perform a bias adjustment so as to keep the optical output characteristics of an optical modulator constant.

2. Description of the Related Art

In a dense wavelength division multiplexing (DWDM) optical transmission system, multiple optical signals having different wavelengths are transmitted through one optical fiber. Consequently, the DWDM optical transmission system achieves an improved transmission efficiency. Further, the DWDM optical transmission system can transmit optical signals regardless of their transmission speed. Therefore, the DWDM optical transmission systems are now employed in ultrahigh-speed Internet where the transmission amount has recently been increasing. In order to keep the transmission performance constant and reduce the differences in transmission performance among respective channels in such a DWDM optical transmission system, it is of the highest importance to keep the optical output characteristics of an optical modulator constant, in the transmitting end.

Generally, an optical modulator (using an electro-optic effect) has an on/off characteristic that varies according to an applied voltage. It also has a sine function characteristic and typically performs intensity modulation by a voltage $V\pi$ for the on/off operation. The magnitude of an applied electric signal and the selection of an operation point are important, for a complete on/off operation of an optical signal magnitude-modulated through the optical modulator. This operation point is where the optical output characteristic that typically indicates a value of $V\pi/2$ becomes ½ of the original value, and where the intensity modulation is performed.

FIG. 1 schematically illustrates a general optical modulator. The optical modulator 10 has two interference type optical waveguides 10a and 10b provided therein. It shows a periodic optical output characteristic through a phase delay between the optical waveguides. This phase delay is induced by an RF electrode provided between the optical waveguides inside the optical modulator. Also, a separate electrode is provided in the optical modulator to adjust an operation voltage.

FIG. 2 illustrates the change of the optical output characteristic of the optical modulator of FIG. 1 according to a change of bias voltage. In FIG. 2, a required signal having a magnitude of $V\pi$ for the on/off operation is applied. The operation point that is used to keep the constant output characteristic is indicated as a bold dotted line. This operation point acts as an important parameter that determines the transmission distance in accordance with a signal applying method.

Such an optical modulator may produce a minute change of the transfer characteristic in accordance with an external temperature and long-time operation. This change in the transfer characteristic directly causes a change in the operation point.

FIG. 3 illustrates the distortion of an output signal according to the change of the output characteristic of the optical modulator. In FIG. 3, if the transfer characteristic of the optical modulator (which performs the on/off modulation based on the operation point having a value of $V\pi/2$) is changed due to an external cause, the same output characteristic can not be obtained even though the operation point is kept the same. This implies distortion of the modulated signal. It is the role of a bias adjustment apparatus to locate the operation point to match the output characteristic, which changes due to an external change.

A bias adjustment method for a conventional optical modulator applies a pilot tone signal having a constant frequency unlike an information signal, e.g., an electric dithering signal, to an input optical signal.

FIG. 4 is a view explaining the concept of bias adjustment of a conventional optical modulator. In FIG. 4, if the operation point where the optical modulator is initially located is 'A', an average current 42 of a photo detector 41 located at the optical output terminal becomes zero when a complete on/off operation is performed. If the operation point is changed to 'B' or 'C' due to the change of the optical transfer characteristic according to the external change, a signal component 43 or 44 that is smaller or larger than the average current is produced. Accordingly, by detecting and tracking this signal component, the applied bias voltage is adjusted to the point where the average current becomes '0', so that the optical output is kept constant.

However, the conventional optical modulator has drawbacks in that noise may be generated in the system. In particular, the pilot tone signal may have a relatively large amplitude in order to detect the distorted components of the signal, thus, the pilot tone signal may act as noise in regard to the information signal.

SUMMARY OF THE INVENTION

Accordingly, the present invention has been made to reduce to overcome the above-mentioned problems occurring in the prior art. An object of the present invention is to provide an optical modulating apparatus having a bias controller and a bias control method, which can maintain an operation point with high accuracy, and with a simple construction. The apparatus includes using the change of a second harmonic signal of an optical output signal generated due to a non-linear transfer characteristic of an optical modulator when an RF signal is applied.

In accordance with the principles of the present invention an optical modulating apparatus having a bias controller is provided, comprising an optical modulator to modulate an optical carrier using a bias signal; and a bias controller to adjust the bias signal of the optical modulator by detecting a second harmonic signal of the modulated optical signal, setting a minimum point of the second harmonic signal as a reference bias voltage, and then comparing a magnitude of the second harmonic signal that changes according to an external environment with a magnitude of a signal generated from the reference bias voltage.

Preferably, the bias controller comprises an optical detection unit to measure the intensity of the modulated optical signal, a band-pass filter to pass the second harmonic signal among detected signals, a comparator to compare a current value of the second harmonic signal with a current value of a harmonic signal generated from the reference bias voltage, a DC bias supplier to adjust a bias voltage supplied to the optical modulator according to a comparison result of the comparator, and an RF signal generator for generate an RF signal having a low-frequency characteristic to the optical modulator along with the bias voltage.

In another aspect of the present invention, a bias control method is provided for an optical modulator that modulates an inputted optical carrier according to a data signal and a bias signal and outputs the modulated optical signal, the method comprising: presetting a bias operation voltage $V_{bias}$ of the optical modulator and a current value $I_{SHD}$ of a second harmonic signal; determining whether the harmonic signal has a minimum value in the bias operation voltage, if false, controlling the bias voltage supplied to the optical modulator, if true, setting the bias operation voltage as a reference voltage $V_{ref}$ and setting a current at this time as a current value $I_{SHD\_ref}$ of the second harmonic signal generated from the reference bias voltage; and controlling a magnitude of the bias voltage supplied to the optical modulator thereby controlling the current value $I_{SHD}$ of the second harmonic signal of the optical modulator.

Preferably, the controlling the magnitude of the bias voltage step comprises: if the current value $I_{SHD}$ of the second harmonic signal of the optical modulator is larger than the current value $I_{SHD\_ref}$ of the second harmonic signal generated from the reference bias voltage, controlling the magnitude of the bias voltage supplied to the optical modulator so that the magnitude of the bias voltage supplied to the optical modulator is lower than the magnitude of the reference bias voltage; if the current value $I_{SHD}$ of the second harmonic signal of the optical modulator is smaller than the current value $I_{SHD\_ref}$ of the second harmonic signal generated from the reference bias voltage, controlling the magnitude of the bias voltage supplied to the optical modulator so that the magnitude of the bias voltage supplied to the optical modulator is higher than the magnitude of the reference bias voltage; and if the current value $I_{SHD}$ of the second harmonic signal of the optical modulator is the same as the current value $I_{SHD\_ref}$ of the second harmonic signal generated from the reference bias voltage, returning to the setting the bias operation voltage as a reference voltage $V_{ref}$ step.

BRIEF DESCRIPTION OF THE DRAWINGS

The present invention will be more apparent from the following detailed description taken in conjunction with the accompanying drawings, in which.

DETAILED DESCRIPTION

Hereinafter, an optical modulating apparatus having a bias controller and a bias control method according to preferred embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
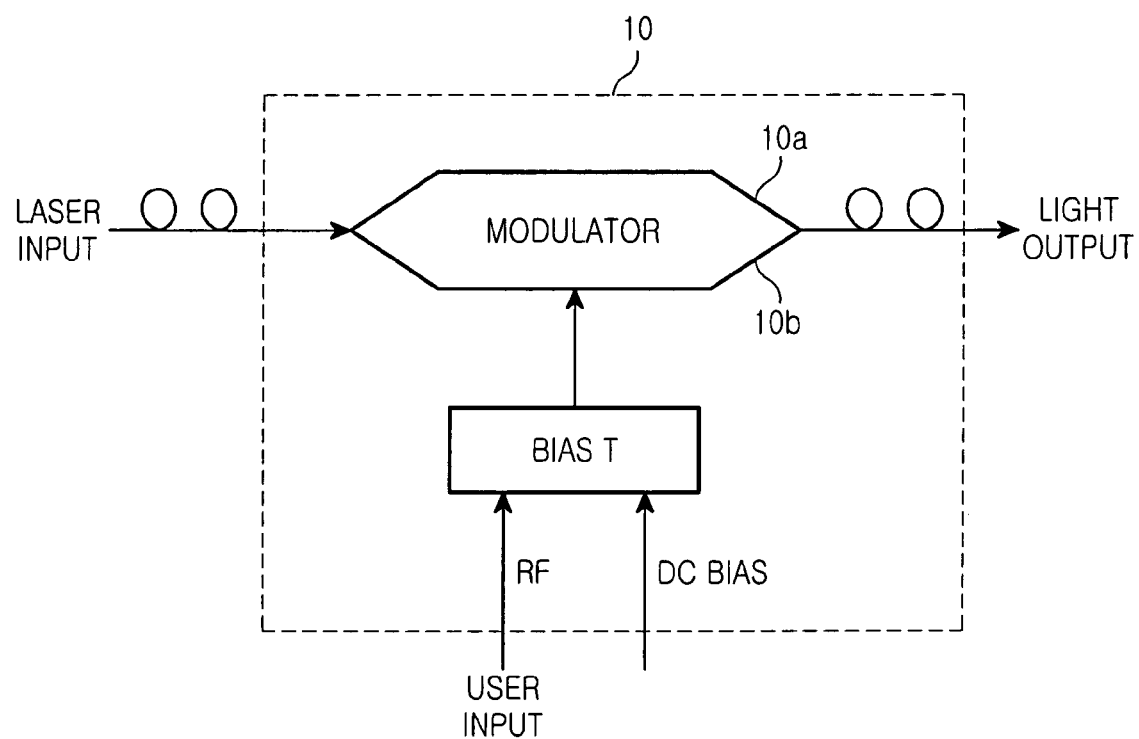
FIG. 1 schematically illustrates a general optical modulator.
Figure 2:
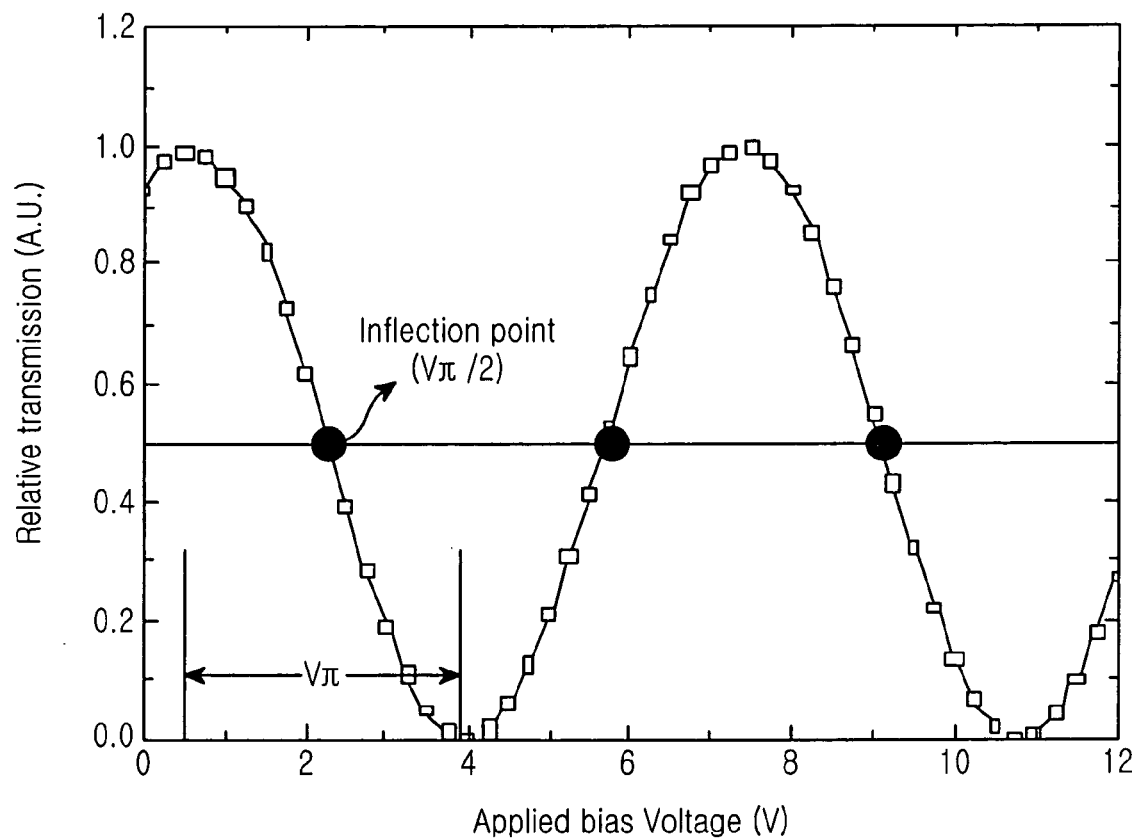
FIG. 2 illustrates the change of the optical output characteristic of the optical modulator of FIG. 1 according to the change of its bias voltage.
Figure 3:
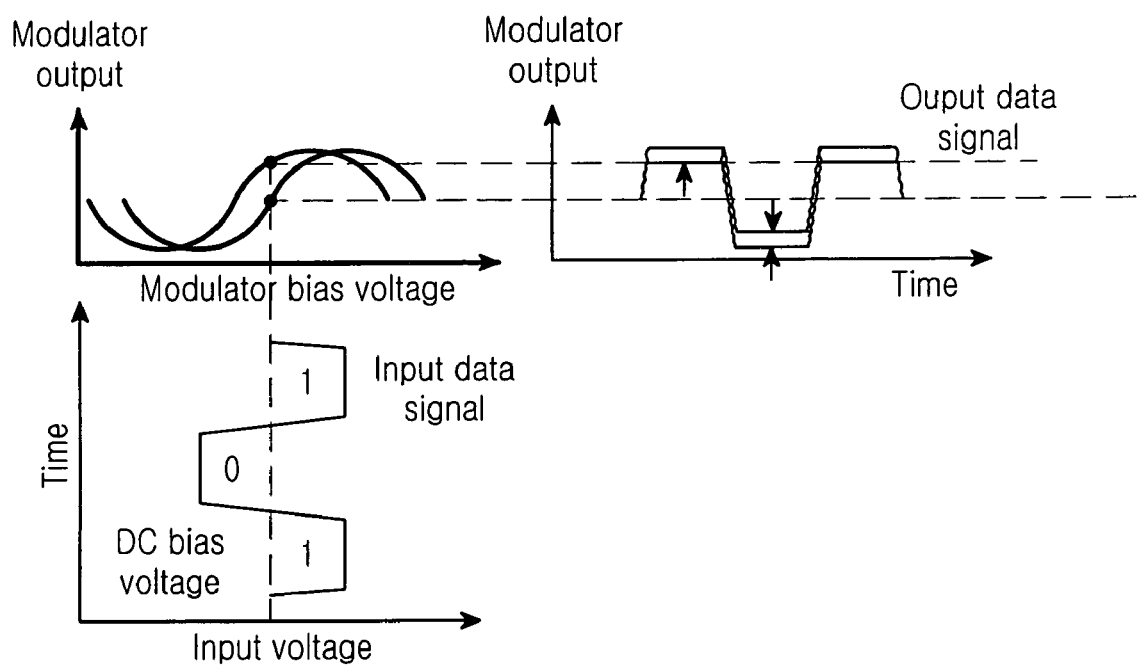
FIG. 3 illustrates the distortion of an output signal according to the change of the output characteristic of the optical modulator.
Figure 4:
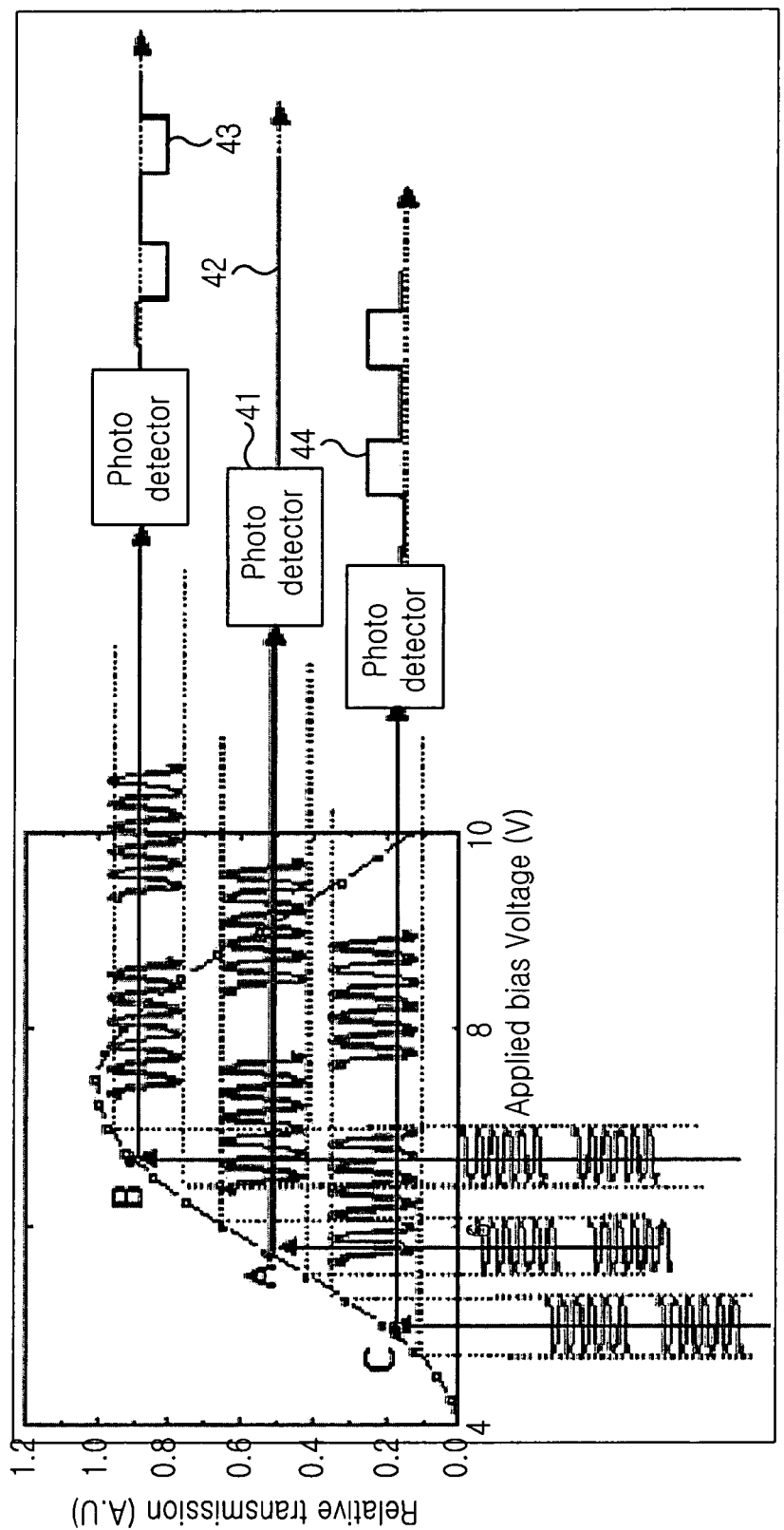
FIG. 4 is a view explaining the concept of bias adjustment of a conventional optical modulator.
Figure 5:
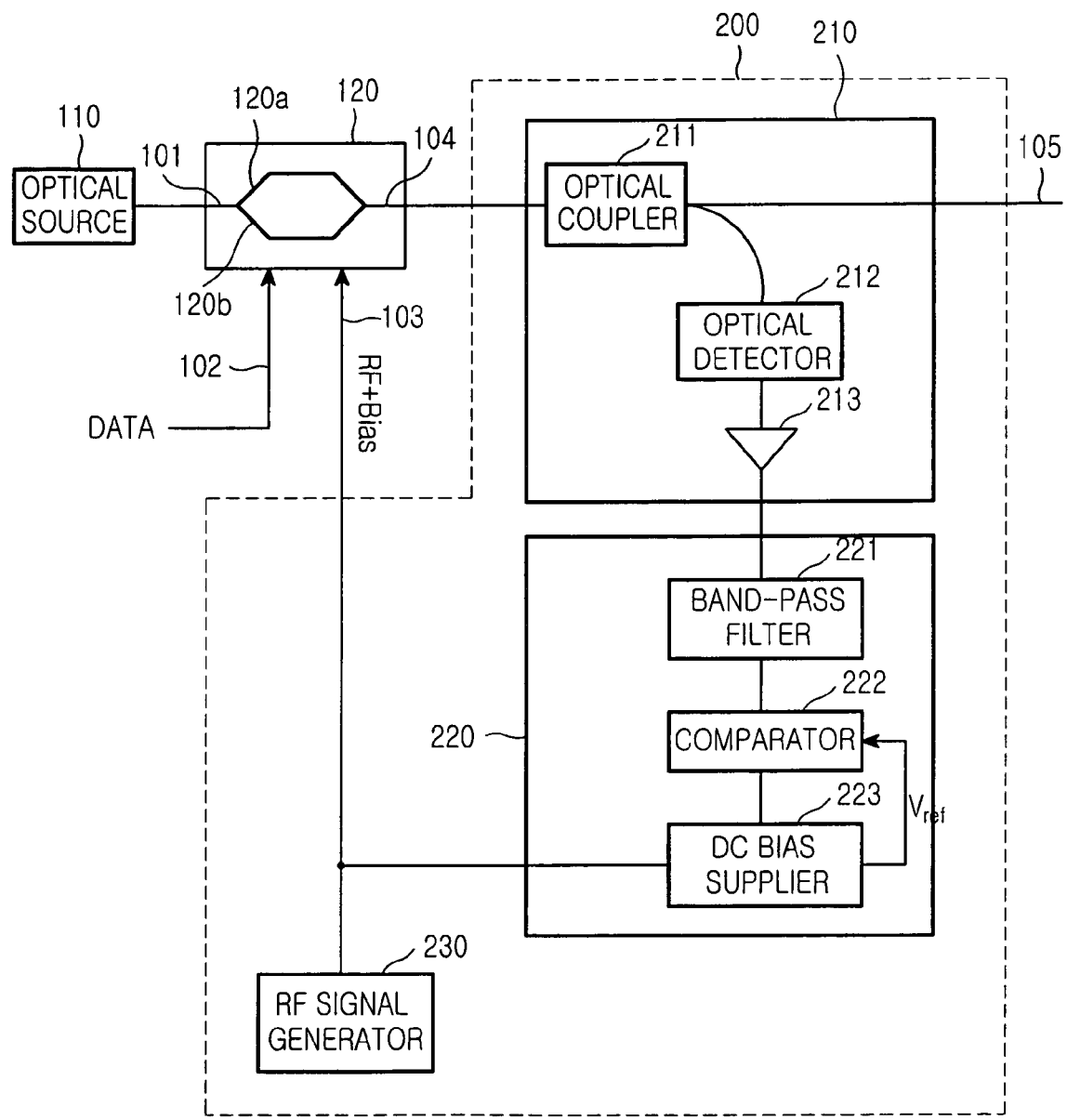
FIG. 5 illustrates an optical modulating apparatus having a bias controller according to an embodiment of the present invention.

FIG. 5 illustrates an optical modulating apparatus having a bias controller according to an embodiment of the present invention.

Referring to FIG. 5, the optical modulating apparatus 100 according to the present invention includes an optical source 110, an optical input port 101, a data signal input port 102, a bias signal input port 103, an optical output port 104, an optical modulator 120 for modulating an input optical signal from the optical source, and a bias controller 200 for detecting an output signal of the optical modulator and adjusting a bias of the optical modulator 120.

The optical source 110 (which may be implemented, for example, by a laser diode that operates in a wavelength band of 1550 nm) generates an optical signal to be used as an optical carrier.

The optical modulator 120 may be implemented by an interference type modulator such as a Mach-Zender modulator. The optical modulator 120, which has two interference type optical waveguides 120a and 120b, receives the optical carrier through the optical input port 101. It modulates the optical carrier according to electric signals inputted through the data signal input port 102a and the bias signal input port 103 to generate a modulated optical signal.

The bias controller 200 includes an optical detection unit 210, a bias control unit 220, and an RF signal generator 230 having a low-frequency characteristic. The optical detection unit 210 includes an optical coupler 211, an optical detector 212, and an RF amplifier 213. Optical detection unit 210 extracts the modulated optical signal outputted from the optical output port 104 through the optical coupler 211 and measures the intensity of the output optical signal. The optical coupler 211 extracts a small amount, for example, less than 5% of the modulated optical signal, and outputs the remaining 95% of the modulated optical signal through the optical waveguide 105. The amplifier 213 amplifies the electric signal detected through the optical detector 212. The amplifier 213 may be omitted if the magnitude of the electric signal detected through the optical detector 212 is sufficiently large.

Figure 6:
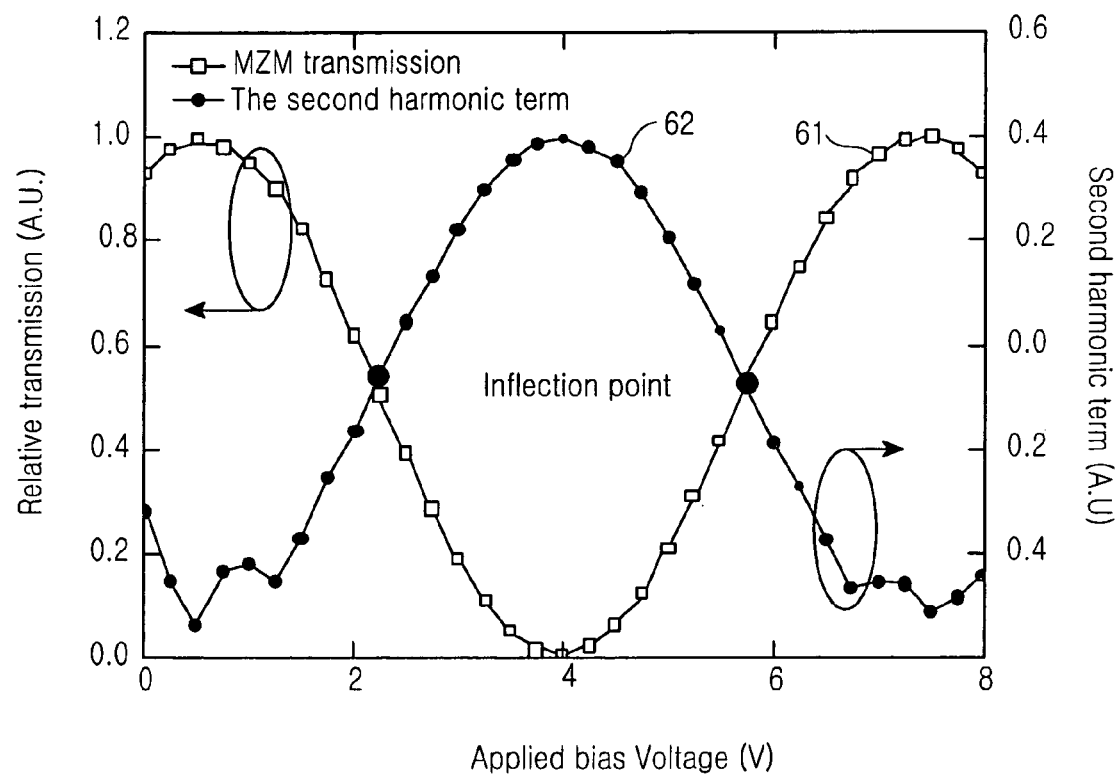
FIG. 6 illustrates the output change of a second harmonic signal according to an applied bias voltage of a general optical modulator.
Figure 7:
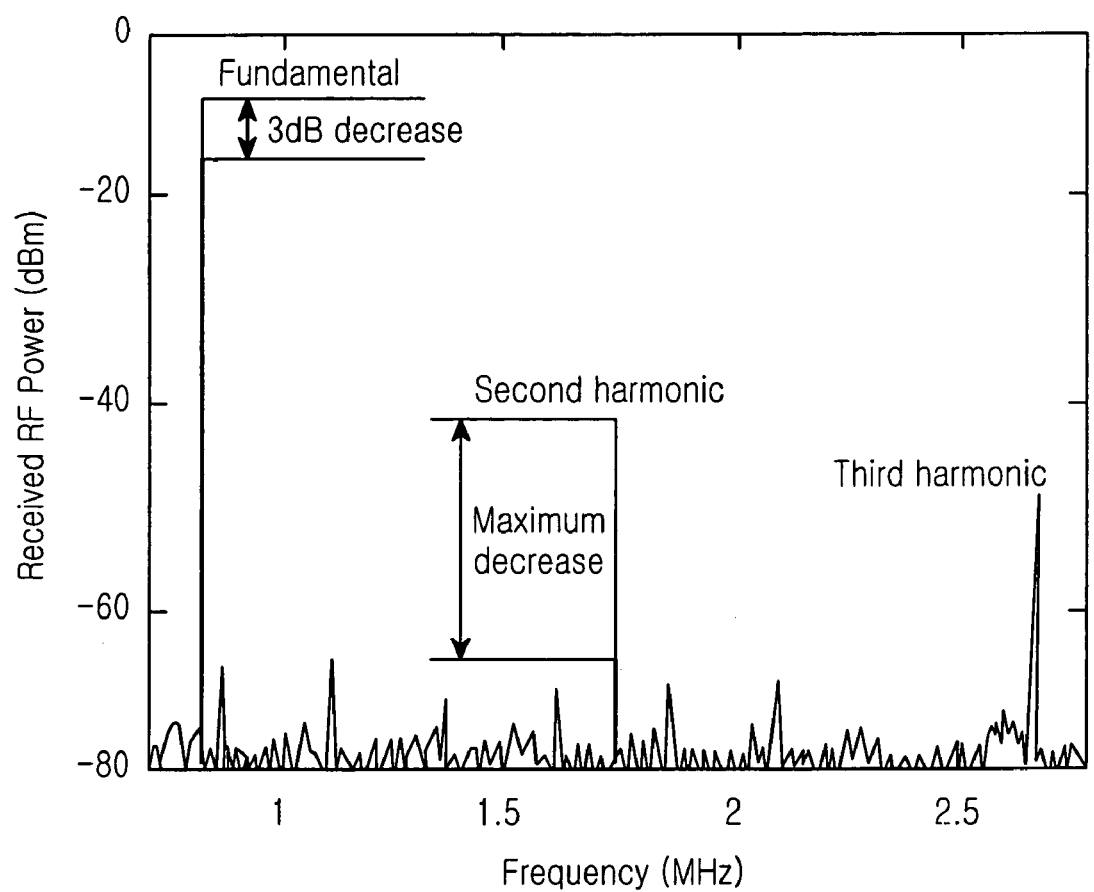
FIG. 7 illustrates an RF spectrum of an output signal as illustrated in FIG. 6.

FIG. 6 illustrates the output change of a second harmonic signal according to an applied bias voltage of an optical modulator. FIG. 7 illustrates an RF spectrum of the output signal of FIG. 6.

As shown in FIG. 6, the bias voltage is applied along with the RF signal having the low-frequency characteristic. If it is assumed that the RF signal, which has a magnitude of Vc and is applied along with a constant bias voltage, is VcSinWct, the optical modulator having the harmonic transfer characteristic generates the harmonic output signal as shown in FIG. 7. Generally, the transfer function at a point of the harmonic transfer curve can be expressed by Taylor Series as shown in Equation 1 below, and respective differential terms of Equation 1 define components of the harmonic signal.

$$\frac{P_{out}}{P_{in}}(V) = f(V) =$$

$$f(Vb) + \frac{df}{dV}\bigg|_{Vb} V_m + \frac{1}{2!}\frac{d^2f}{dV^2}\bigg|_{Vb} V_m^2 + \frac{1}{3!}\frac{d^3f}{dV^3}\bigg|_{Vb} V_m^3$$

[Equation 1]

Accordingly, as shown in FIGS. 6 and 7, the change of the magnitude component of the second differential rate of changes determines the second harmonic component. The inflection point of the transfer curve 61 becomes the point where the second harmonic signal 62 reaches a minimum. Accordingly, the magnitude of the fundamental frequency at the inflection point decreases by 3 dB. However, the magnitude of the second harmonic signal reaches a minimum. Thus, the change of the difference between the output signals can be easily recognized even with respect to a relatively small change of the applied voltage. Accordingly, in operating the optical modulator (the operation point of which must be kept at the inflection point that is the $V\pi/2$ point of the transfer curve for the intensity modulation) a constant output characteristic can be kept through the magnitude change of the second harmonic signal. This is true even if the transfer characteristic is changed according to the change of the external environment by using the relationship between the transfer curve and the non-linear output signal.

Referring again to FIG. 5, the bias control unit 220 includes a band-pass filter 221, a comparator 222, and a DC bias supplier 223.

The band-pass filter 221 passes the second harmonic signal among the signals detected by the optical detection unit 210.

The comparator 222 compares a current value $I_{SHD}$ of the second harmonic signal that has passed through the band-pass filter 220 with a current value $I_{SHD\_ref}$ of the second harmonic signal generated from the reference bias voltage $V_{ref}$.

The DC bias supplier 223 increases or decreases the bias voltage supplied to the optical modulator 120 according to a comparison result of the comparator 222. If the current value $I_{SHD}$ of the detected second harmonic signal is larger than the current value $I_{SHD\_ref}$ of the second harmonic signal generated from the reference bias voltage $V_{ref}$ (i.e., $I_{SHD}>I_{SHD\_ref}$), the DC bias supplier lowers the bias operation voltage below the reference bias voltage. If the current value $I_{SHD}$ of the detected second harmonic signal is smaller than the current value $I_{SHD\_ref}$ of the second harmonic signal generated from the reference bias voltage $V_{ref}$ (i.e., $I_{SHD}<I_{SHD\_ref}$), the DC bias supplier heightens the bias operation voltage above the reference bias voltage.

The RF signal generator 230 that has the low-frequency characteristic is for extracting only the harmonic signal of an analog signal. The RF signal is applied to the optical modulator 120 along with the bias voltage provided by the DC bias supplier 223.

The operation of the optical modulating apparatus as constructed above will be explained with reference to FIGS. 5, 8 and 9.

Figure 8:
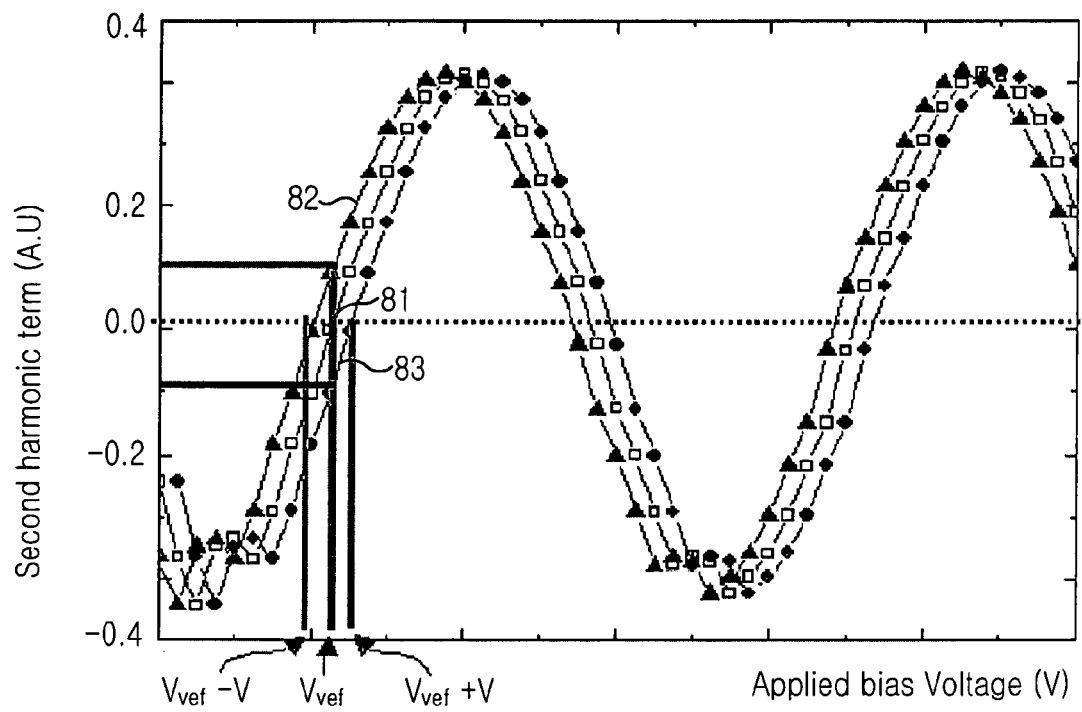
FIG. 8 is a view explaining a bias voltage control according to the change of the output characteristic of the optical modulator using the optical modulating apparatus of FIG. 5.

Referring to FIGS. 5 and 8, the bias operation voltage $V_{bias}$ initially set at the inflection point 81 that is the $V\pi/2$ point becomes the reference value $V_{ref}$, and at this time. The second harmonic signal is kept at a minimum value. However, as the transfer characteristic is changed according to the external environment, the second harmonic signal that has the minimum value at the reference bias voltage decreases or increases 82 or 83 according to the external environment. The second harmonic signal detected through the optical detector 212 and the band-pass filter 221 moves to the minimum point of the second harmonic signal of the transfer characteristic that is changed from the reference bias voltage $V_{ref}$ through the adjustment of the external voltage. If the transfer characteristic of the optical modulator is changed due to temperature or other external factors after the minimum point of the second harmonic signal is set as the reference bias voltage $V_{ref}$, the magnitude of the second harmonic signal increases or decreases on the basis of the current value $I_{SHD\_ref}$ of the second harmonic signal generated at the reference bias voltage $V_{ref}$. Accordingly, after the 50% point of the transfer curve is set through the DC bias supplier 223, it is supplied as the reference bias voltage $V_{ref}$ of the comparator 222 and the current value $I_{SHD\_ref}$ of the second harmonic signal. The increase of the current of the second harmonic signal means the change of the transfer curve to the left 82. At this time, the DC bias supplier 223 is set to a negative value of $V_{ref}-V$ from the reference bias voltage $V_{ref}$. Meanwhile, the decrease of the current of the second harmonic signal means the change of the transfer curve to the right 83. At this time, the DC bias supplier 223 is set to a positive value of $V_{ref}+V$ from the reference bias voltage $V_{ref}$.

Figure 9:
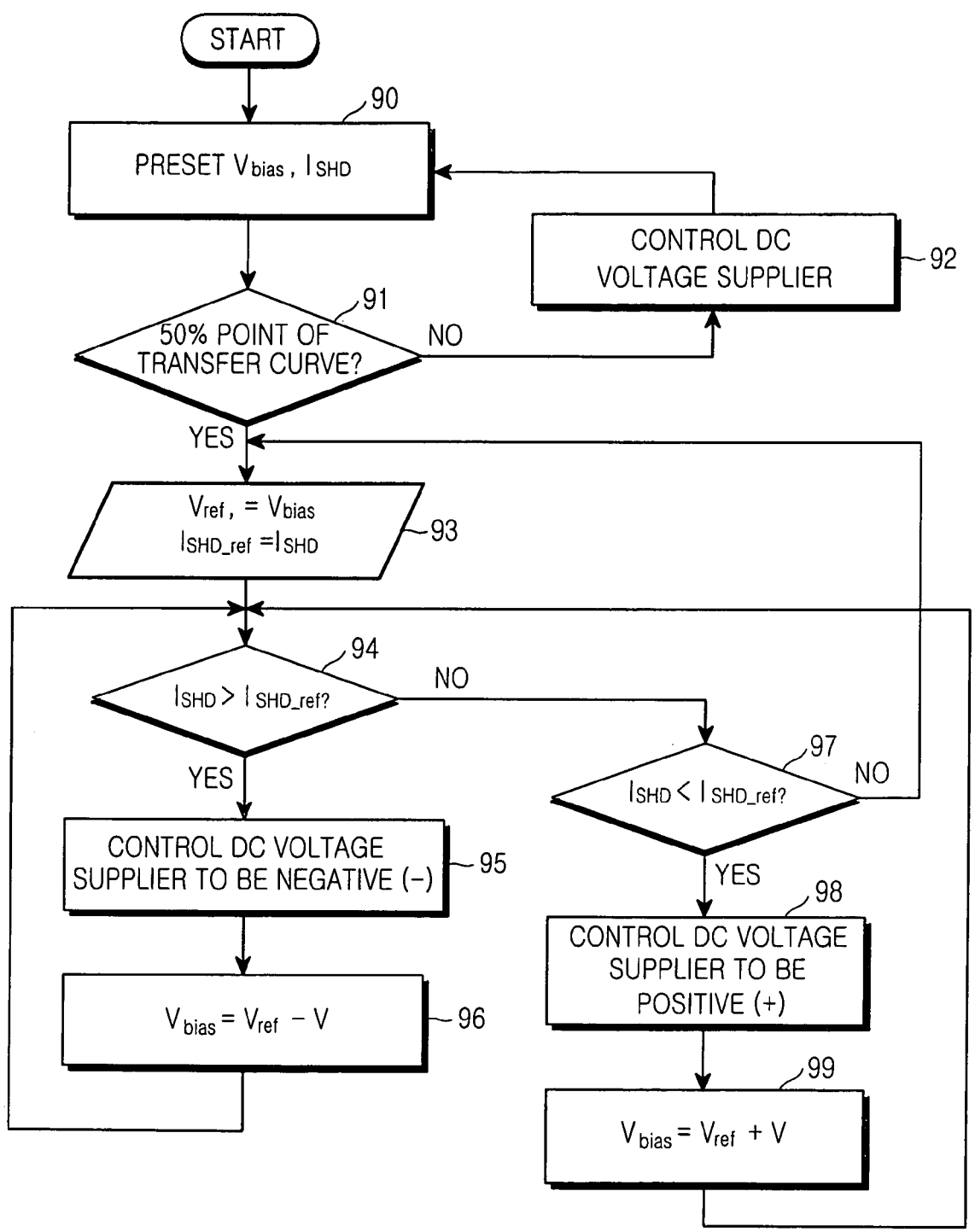
FIG. 9 is a flowchart illustrating a bias voltage control method according to the change of the output characteristic of the optical modulator using the optical modulating apparatus of FIG. 5.

FIG. 9 is a flowchart illustrating a bias voltage control method according to the change of the output characteristic of the optical modulator using the optical modulating apparatus of FIG. 5.

Referring to FIG. 9, the bias operation voltage $V_{bias}$ of the optical modulator and the current value $I_{SHD}$ of the second harmonic signal are preset (step 90). Then it is determined if it is the inflection point corresponding to the 50% point of the transfer curve (step 91). If it is not the 50% point of the transfer curve, the DC voltage supplier is controlled (step 92), and the above-described operation is repeated. In contrast, if it is the 50% point of the transfer curve, the bias operation voltage $V_{bias}$ of the optical modulator is set as the reference bias voltage $V_{ref}$ of the comparator and the current value $I_{SHD}$ of the second harmonic signal is set as the current value $I_{SHD\_ref}$ of the second harmonic signal generated from the reference bias voltage $V_{ref}$ (step 93).

If the current value $I_{SHD}$ is larger than the current value $I_{SHD\_ref}$ (i.e., $I_{SHD}>I_{SHD\_ref}$) (step 94) after the reference voltage value of the comparator and the current value $I_{SHD\_ref}$ of the second harmonic signal at this time are set, the bias operation voltage $V_{bias}$ is set to a value lower than the reference bias voltage $V_{ref}$ (i.e., $V_{bias}=V_{ref}-V$) (step 96). This is accomplished by controlling the DC bias supplier to be negative (step 95), and the above-described operation is repeated.

If the current value $I_{SHD}$ is not larger than the current value $I_{SHD\_ref}$, it is judged again whether the current value $I_{SHD}$ is smaller than the current value $I_{SHD\_ref}$ (i.e., $I_{SHD}<I_{SHD\_ref}$) (step 97). If the current value $I_{SHD}$ is smaller than the current value $I_{SHD\_ref}$, the bias operation voltage $V_{bias}$ is set to a value higher than the reference bias voltage $V_{ref}$ (i.e., $V_{bias}=V_{ref}+V$) (step 99). This is accomplished by controlling the DC bias supplier to be positive (step 98), and the above-described operation is repeated.

If the current value $I_{SHD}$ is not smaller than the current value $I_{SHD\_ref}$, it means that the current value $I_{SHD}$ is the same as the current value $I_{SHD\_ref}$, and the values at this time are set as the reference bias voltage $V_{ref}$ of the comparator and the current value $I_{SHD\_ref}$ of the second harmonic signal generated from the reference bias voltage $V_{ref}$, respectively.

As described above, the optical modulating apparatus according to the present invention is provided with a bias control apparatus for controlling a bias voltage of the optical modulator by using a feedback loop through the detection of a harmonic signal. Accordingly, in implementing an optical communication system provided with an optical modulator, stable transmission characteristics can be kept with a compact construction.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical modulating apparatus, comprising:
   an optical modulator to modulate an optical carrier using a bias signal; and
   a bias controller to adjust the bias signal of the optical modulator by detecting a second harmonic signal of the modulated optical signal, setting a minimum point of the second harmonic signal as a reference bias voltage, and then comparing a magnitude of the second harmonic signal that changes according to an external environment with a magnitude of a signal generated from the reference bias voltage.

2. The optical modulating apparatus as claimed in claim 1, further including an optical source to generate the optical carrier.

3. The optical modulating apparatus as claimed in claim 1, wherein the modulated optical signal includes a data signal.

4. The optical modulating apparatus as claimed in claim 1, wherein the optical modulating apparatus outputs the modulated optical signal.

5. The optical modulating apparatus as claimed in claim 1, wherein the bias controller comprises:
   an optical detection unit to measure the intensity of the modulated optical signal;
   a band-pass filter to pass the second harmonic signal among detected signals;
   a comparator to compare a current value of the second harmonic signal with a current value of a harmonic signal generated from the reference bias voltage;
   a DC bias supplier to adjust a bias voltage supplied to the optical modulator according to a comparison result of the comparator; and
   an RF signal generator to generate an RF signal having a low-frequency characteristic and supply the RF signal to the optical modulator along with the bias voltage.

6. The optical modulating apparatus as claimed in claim 5, wherein the reference bias voltage is a voltage at an inflection point of a transfer curve.

7. The optical modulating apparatus as claimed in claim 6, wherein the inflection point is a 50% point of the transfer curve.

8. The optical modulating apparatus as claimed in claim 5, wherein the optical detection unit comprises:
   an optical coupler to extract a part of the modulated optical signal;
   an optical detector to detect an intensity of the extracted optical signal; and
   an amplifier to amplify the detected signal.

* * * * *